(12) United States Patent
Burke

(10) Patent No.: US 8,920,271 B2
(45) Date of Patent: Dec. 30, 2014

(54) TORSION CUSHIONING SPROCKET

(76) Inventor: Ryan Burke, Burpengary (AU)

( * ) Notice: Subject to any disclaimer, the term of this patent is extended or adjusted under 35 U.S.C. 154(b) by 382 days.

(21) Appl. No.: 13/353,411

(22) Filed: Jan. 19, 2012

(65) Prior Publication Data

US 2012/0135830 A1 May 31, 2012

(30) Foreign Application Priority Data

Aug. 4, 2009 (AU) .............................. 2009903629

(51) Int. Cl.
 - *F16H 55/14* (2006.01)
 - *F16H 55/30* (2006.01)
 - *B62M 9/02* (2006.01)
 - *F16D 3/68* (2006.01)

(52) U.S. Cl.
CPC ............... *F16H 55/30* (2013.01); *B62M 9/02* (2013.01); *F16D 3/68* (2013.01); *F16H 2055/306* (2013.01)
USPC .......................................................... 474/94

(58) Field of Classification Search
CPC ..... F16H 55/30; F16H 2055/306; F16D 3/68; B62M 9/02
USPC .......................................... 474/94, 152–156
See application file for complete search history.

(56) References Cited

U.S. PATENT DOCUMENTS

| | | | |
|---|---|---|---|
| 3,257,860 A * | 6/1966 | Runde et al. .................. | 474/94 |
| 4,328,879 A | 5/1982 | Tone | |
| 4,585,431 A | 4/1986 | Umeda et al. | |
| 5,113,713 A | 5/1992 | Isabelle et al. | |
| 6,361,461 B1 * | 3/2002 | Pusic ............................ | 474/152 |
| 2003/0080529 A1 | 5/2003 | Morita et al. | |
| 2007/0021249 A1 * | 1/2007 | Shao et al. ...................... | 474/94 |
| 2007/0197327 A1 * | 8/2007 | Arnold et al. ................. | 474/152 |

OTHER PUBLICATIONS

International Search Report for PCT/AU2010/000982, dated Sep. 14, 2010.

* cited by examiner

*Primary Examiner* — William E Dondero
*Assistant Examiner* — Robert T Reese
(74) *Attorney, Agent, or Firm* — Michael J. Feigin, Esq.; Feigin & Associates, LLC

(57) ABSTRACT

A drive sprocket for machines such as a motorcycle includes cushioning elements to reduce spikes in stress levels between the machine's power transmission and a driven member, such as the wheel of motorcycle. The sprocket has an inner plate which is located coaxially within the outer ring. The inner plate is formed with outwardly projecting lugs that are arranged to mesh with the inwardly projecting lugs of outer ring. The outwardly projecting lugs comprise six wide lugs and six narrow lugs disposed alternately around the outside of the inner ring. The outer edges of outwardly projecting lugs are formed with a bearing slot. In the case of the six wide lugs, their bearing slots cooperate with bearing slots on the inside wall of the outer ring to provide a ball bearing race for bearings. The sides of the lugs are also formed with cushion slots to engage cushioning elements.

12 Claims, 13 Drawing Sheets

SECTION A-A
SCALE 1 : 2

SECTION A-A
SCALE 1 : 2

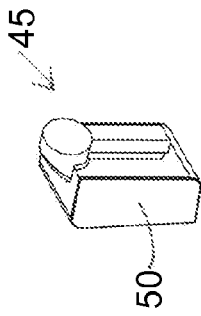
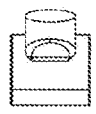
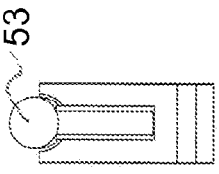
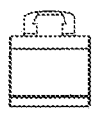
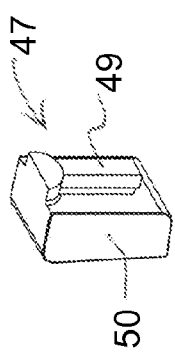
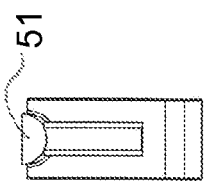
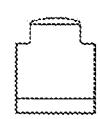
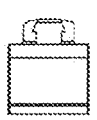

SECTION A-A
SCALE 1:2

TORSION CUSHIONING SPROCKET

TECHNICAL FIELD

The invention relates to a torsion cushioning sprocket. An example of an application of such a sprocket is in the rear wheel drive sprocket of a motorcycle.

BACKGROUND

The discussion of any prior art documents, techniques, methods or apparatus is not to be taken to constitute any admission or evidence that such prior art forms, or ever formed, part of the common general knowledge.

For many years motorcycles have been using "cush drive" rear wheel hubs. These hubs have rubber blocks inside to dampen sudden torsion forces.

One principle disadvantage of this type of hub is that they are a permanent fitting inside the rear wheel and are not easily removed for applications where they are not preferred, such as motorcycle racing, due to the absorption of power and loss of response they create. Another disadvantage of this type of "cush drive" hub is that they are expensive to have installed in the rear wheel, and also considerably heavier than the standard solid hub.

SUMMARY OF THE INVENTION

According to a first embodiment of the present invention there is provided a sprocket comprising
an inner plate having a plurality of radially disposed outward lugs;
an outer ring with corresponding radially disposed inward lugs, supported and revolvable about the inner plate with cushioning material between the said lugs.

Preferably a number of meeting faces of the outer ring and inner plate describe a ball race to receive a plurality of ball bearings.

The outer ring and inner plate are preferably made from metal and the cushioning material is made from an elastomer.

In a preferred embodiment the outer ring and inner plate have a corresponding ridge or groove in their meeting faces.

In one embodiment cushioning material extends between apexes of the radially disposed outward lugs and an inside of the outer ring.

Alternatively, and preferably, the cushioning material comprises a plurality of cushioning elements, each shaped to engage with a side of said lugs.

Preferably a number of the cushioning elements are formed for location between an inside of the outer ring and an outer edge of the radially disposed outward lugs to thereby provide radial cushioning between the inner plate and the outer ring prevent the ingress of debris therebetween.

The outer edges of said outward lugs may have replaceable hardened tips fastened thereto.

The replaceable hardened tips may each bear a tongue and said tongues are preferably received into grooves formed on the inside of the inner plate.

Further embodiments, preferred features and variations will be apparent from the following Detailed Description which will make reference to a number of drawings as follows. Throughout the drawings common item numbers are used to refer to like components.

DESCRIPTION OF THE DRAWINGS

FIGS. 10 to 14 are detail views of a first cushioning element of the sprocket of FIG. 5.
FIGS. 15 to 19 are detail views of a second cushioning element of the sprocket of FIG. 5.

DETAILED DESCRIPTION

Figure 1:
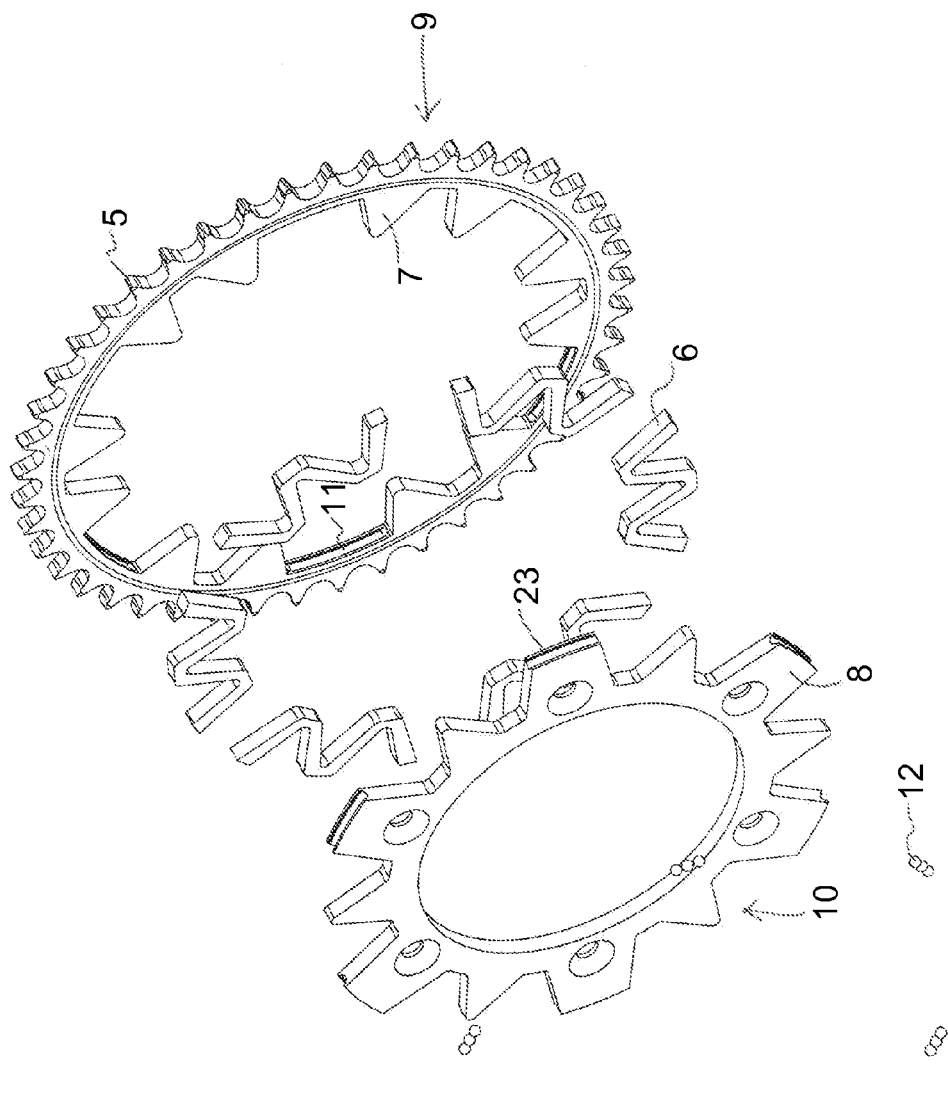
FIG. 1 is an exploded isometric view of a cushioned torsion sprocket according to a first embodiment of the present invention.
Figure 2:
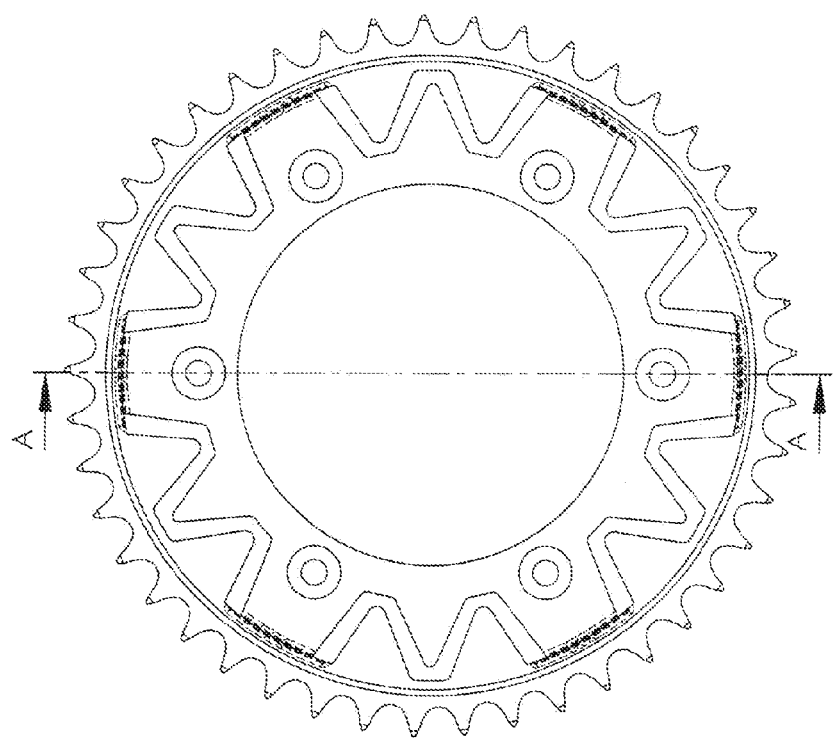
FIG. 2 is a front view of the sprocket of FIG. 1.
Figure 3:
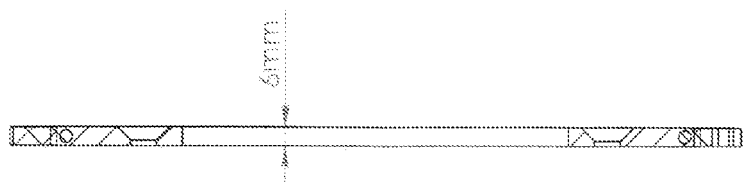
FIG. 3 is a sectional side view of the sprocket of FIG. 2.
Figure 4:
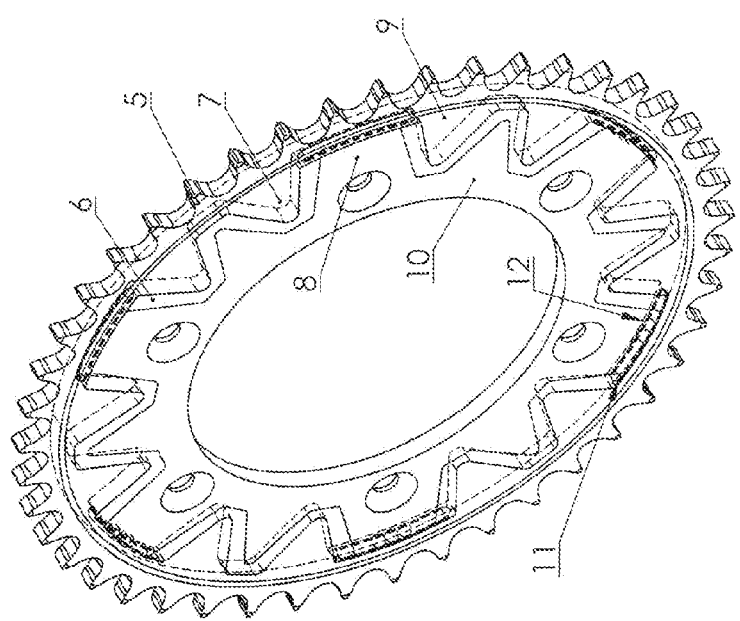
FIG. 4 is an isometric view of the sprocket of FIG. 1 including hidden detail.
Figure 5:
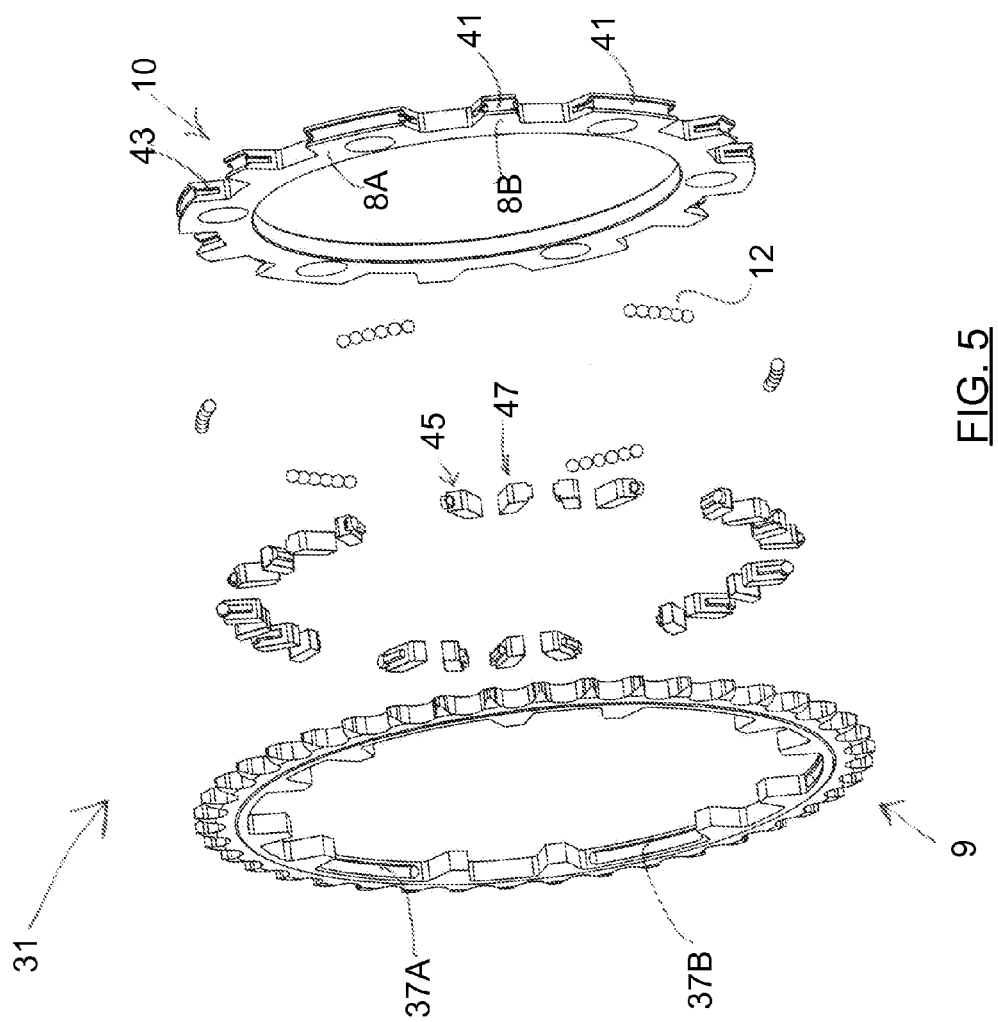
FIG. 5 is an exploded view of a cushioned torsion sprocket according to a preferred embodiment of the present invention.
Figure 6:
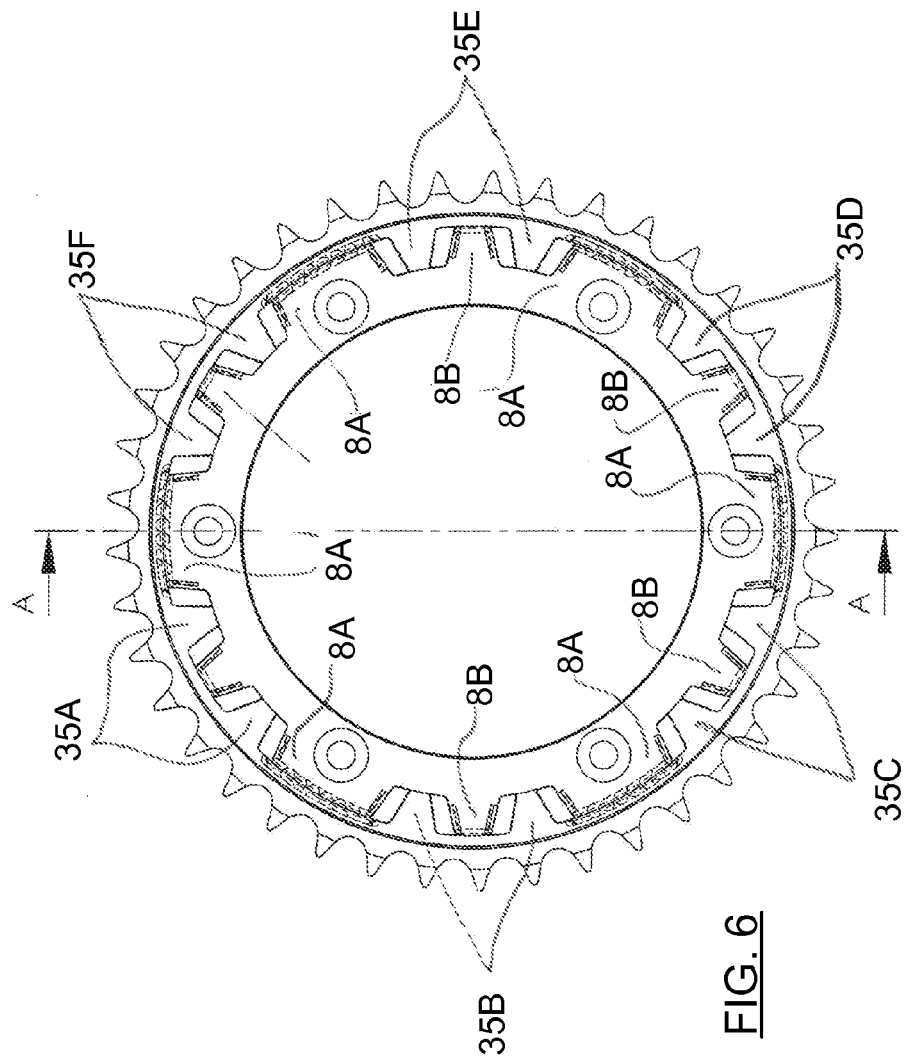
FIG. 6 is a front view of the sprocket of FIG. 5.
Figure 7:
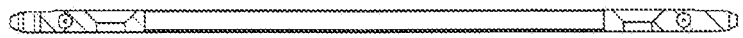
FIG. 7 is a section side view of the sprocket of FIG. 6.

This invention has been devised to enable cushioning of sudden torsion forces by a standard solid wheel hub using a replacement sprocket having inbuilt cushioning.

Referring now to FIGS. 1 to 4, there is depicted in exploded view a first embodiment of a cushioning sprocket in accordance with the invention. The cushioning 10 sprocket 1 comprises of a metal outer ring 9 with a plurality of peripheral teeth 5 and with a plurality of ring lugs 7 disposed radially on the inside edge. As will be explained the ring lugs 7 transmit forces through a cushioning material 6 to corresponding lugs 8 disposed radially about the external edge of an inside metal plate 10.

For revolvably and axially retaining the outer ring on the inside plate, the inside plate and the outside ring preferably have, on their meeting faces, ball receiving race grooves 11 and 23 in which a plurality of loose ball bearings 12 run.

The cushioning material 6 is preferably made of an elastomer that is resistant to oil/grease. The cushioning material 6 is preferably bonded to the inside of the outer ring 9 and the outside face of the inside plate 10. The term face is used herein to mean portions of the interior perimeter of the outside ring and portions of the outer perimeter of the inside plate 10.

The sprocket inside plate 10 and outside ring 9 are preferably made of metal, and are preferably coated to aid in reducing wear and friction.

To recap, the cushioned sprocket 1 comprises an outer ring 9 with external teeth 5, internal cushioning material 6 located between the outer ring's lugs 7 and the inner plate's lugs 8 that cushions and resists rotation of the outer ring 9 relative to the inner plate 10. To revolvably and axially retain the outer ring 9 on the inner plate 10 there is provided, in the meeting faces of the outer ring 9 and inner plates 10, ball receiving race grooves 11 in which a plurality of ball bearings run 12.

Referring now to FIGS. 5 to 9, there is depicted a further, and preferred, embodiment of a torsion sprocket according to the present invention. The sprocket 31 comprises an outer ring 9 with external teeth 5 and inwardly projecting lugs 7. In the particular embodiment shown in FIGS. 5 to 9 six pairs 35A to 35F of the inwardly projecting lugs 7 are provided.

A bearing slots 37A to 37F are formed in the inside wall of the outer ring 9 between each of the six pairs 35A to 35F of the inwardly projecting lugs 7.

An inner plate 10 is located coaxially within the outer ring 9. The inner plate 10 is formed with outwardly projecting lugs 8A that are arranged to mesh with the inwardly projecting lugs 7 of outer ring 9. The outwardly projecting lugs comprise six wide lugs 8A and six narrow lugs 8B disposed alternately around the outside of the inner ring. The outer edge of outwardly projecting lugs, 8A, 8B are formed with a bearing slot 41. In the case of the six wide lugs, their bearing slot 41 cooperate with bearing slots 37A to 37F on the inside wall of the outer ring 9 to provide a ball bearing race for bearings 12.

The sides of the lugs 8A, 8B are also formed with cushion slots 43 to engage cushioning elements 45 and 47.

The cushion elements 45 and 47 are comprised of an elastomeric material being polyurethane in the presently described preferred embodiment. Cushion elements 47 are depicted in detail in FIGS. 10 to 14 whereas cushion element 45 is depicted in FIGS. 15 to 19. The cushion elements 47 and 45 include a body 50 an engagement flange 49 extends down one side of the body 51. The engagement flange 49 is of complementary shape to cushion slots 43 for retention of the engagement flange 49 within a corresponding cushion slot 43.

A semi-disk 51 is formed at the top of engagement flange 49. The semi disk is received within a bearing slot 41 of one of the narrow outwardly extending lugs 8B.

The cushion element 45 is of similar shape to that of cushion element 47 except that a disk 53 is formed at the top of engagement flange 49. The disk 53 is received between one of bearing slots 37A-37F and a bearing slot 41 of one of the wide outwardly extending lugs 8A and acts to prevent dirt and other debris contaminating the bearings.

The bodies 50 of the cushioning elements 45, 47 all abut the sides of both inwardly extending lugs of the outer ring and outwardly extending lugs of the inner plate and are bonded to the inner plate where cushion element flange 49 and slot 43 meet. Accordingly the bodies of the cushioning elements provide cushioning for rotational motion of the inner plate relative to the outer plate and vice versa.

Figure 8:
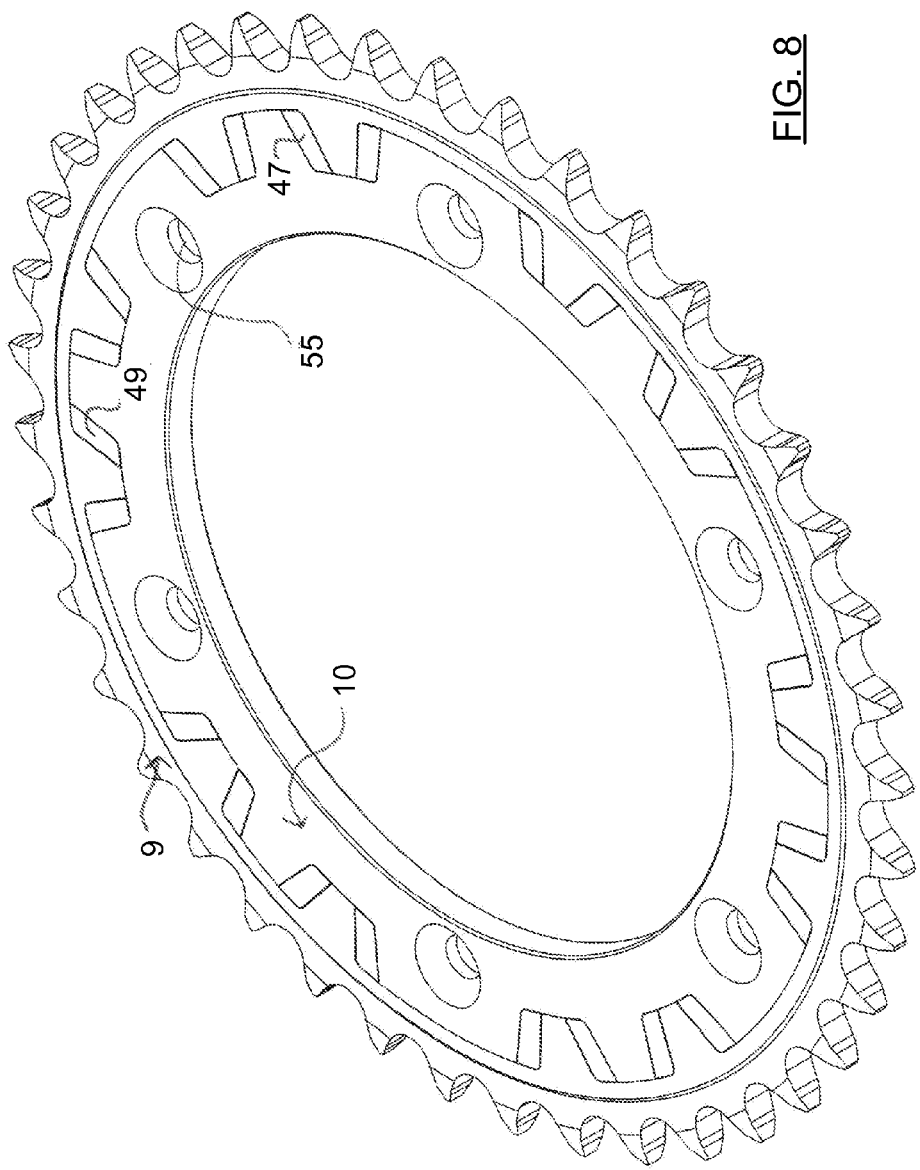
FIG. 8 is an isometric view of the sprocket of FIG. 5 assembled.
Figure 9:
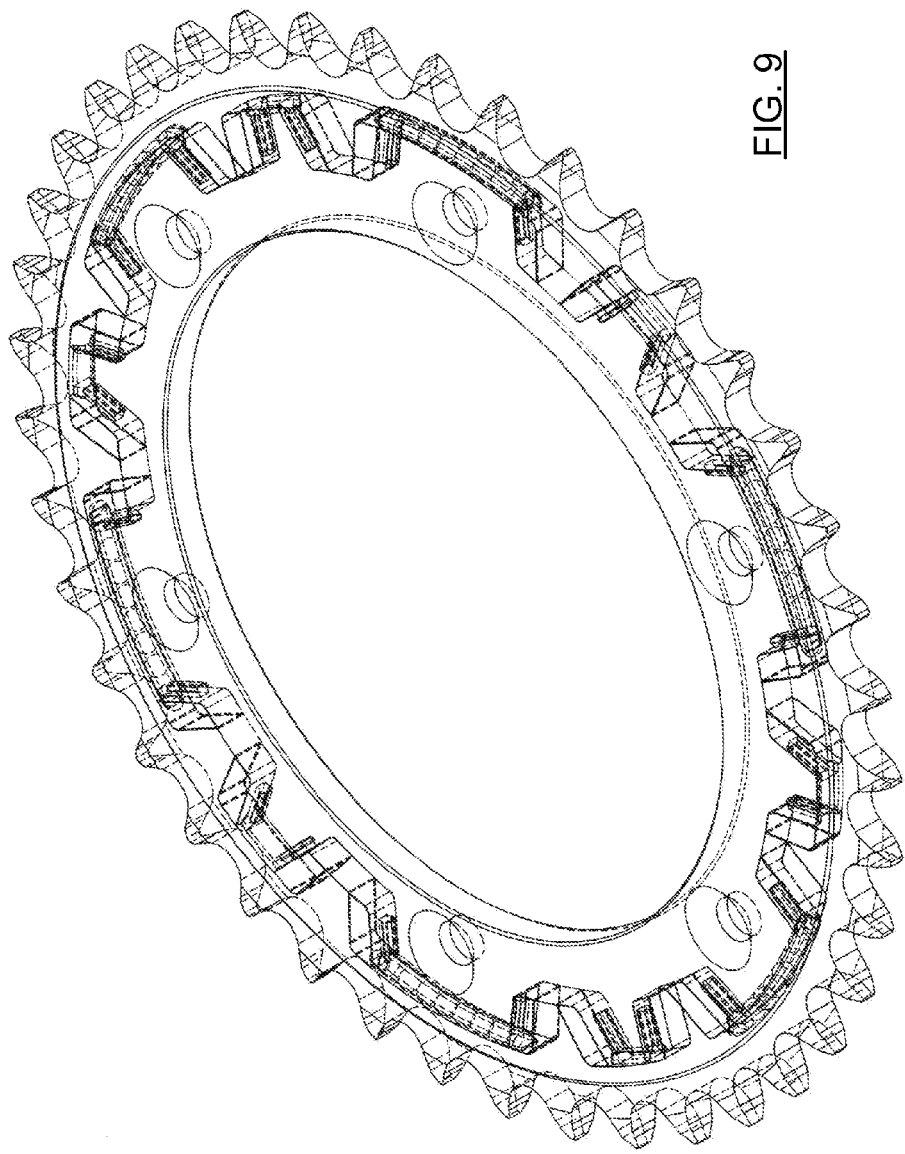
FIG. 9 is an isometric view of the sprocket of FIG. 8 revealing hidden detail.

With reference to FIG. 8, in use a sprocket according to the embodiment of the invention depicted therein, may be fastened to the hub of a motorcycle wheel for example by means of bolts passed through mounting holes 55 formed in inner plate 10. The teeth 5 of outer ring 9 then mesh with a drive chain of the motorcycle. As the outer ring is driven by the drive chain, the bodies 51 of cushioning elements 47, 49 act to provide cushioning for relative rotational movement between outer ring 9 and inner plate 10.

Consequently the cushioning elements reduce spikes in stress levels between the motorcycle transmission and the drive wheel of the motorcycle, which in turn reduces wear on the transmission and provides a more comfortable ride.

It will be realised that the example of use of the torsion sprocket with respect to a motorcycle is simply one example as the torsion sprocket may find application in many other types of machinery as well.

Figure 20:
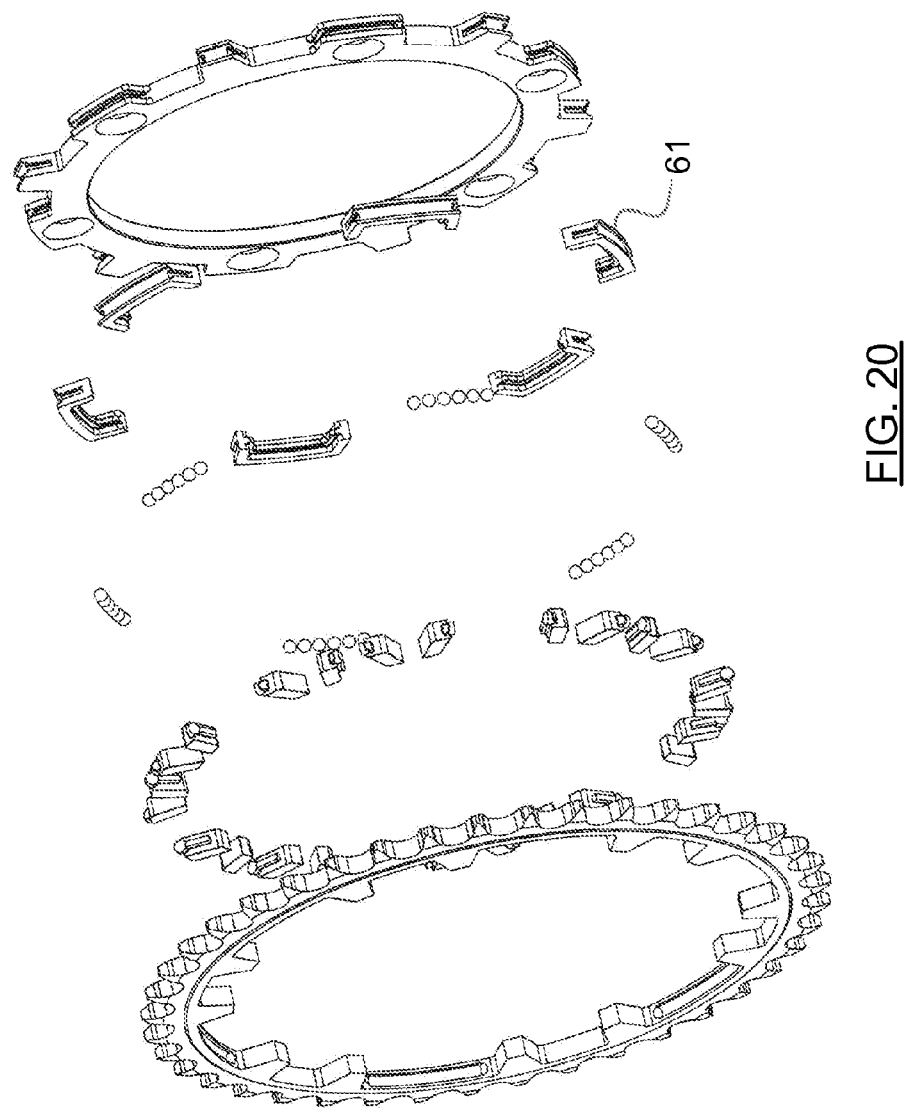
FIGS. 20 to 21 depict a further embodiment of the present invention.
Figure 21:
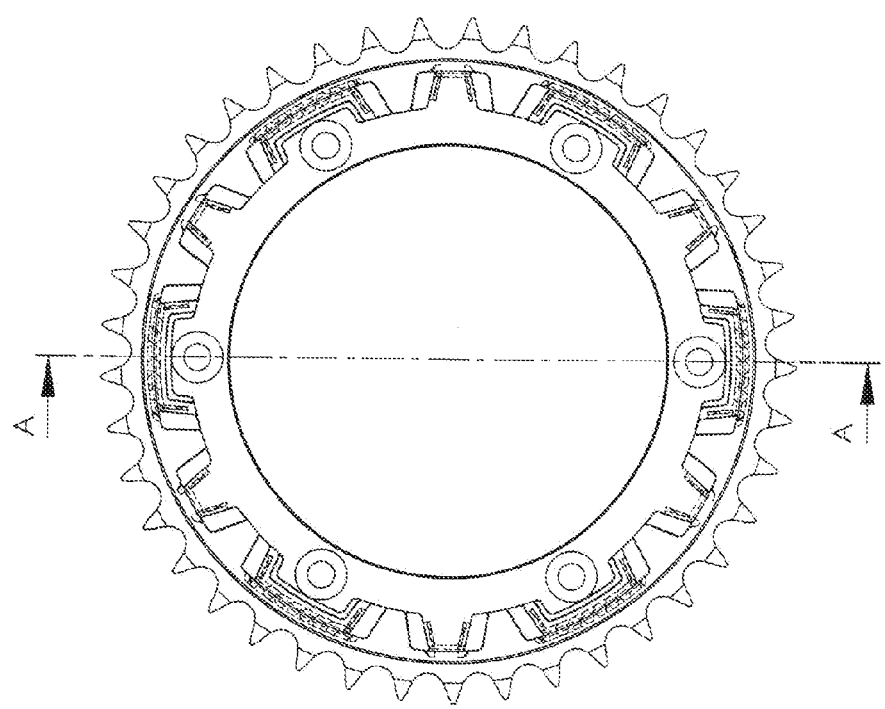
Figure 22:
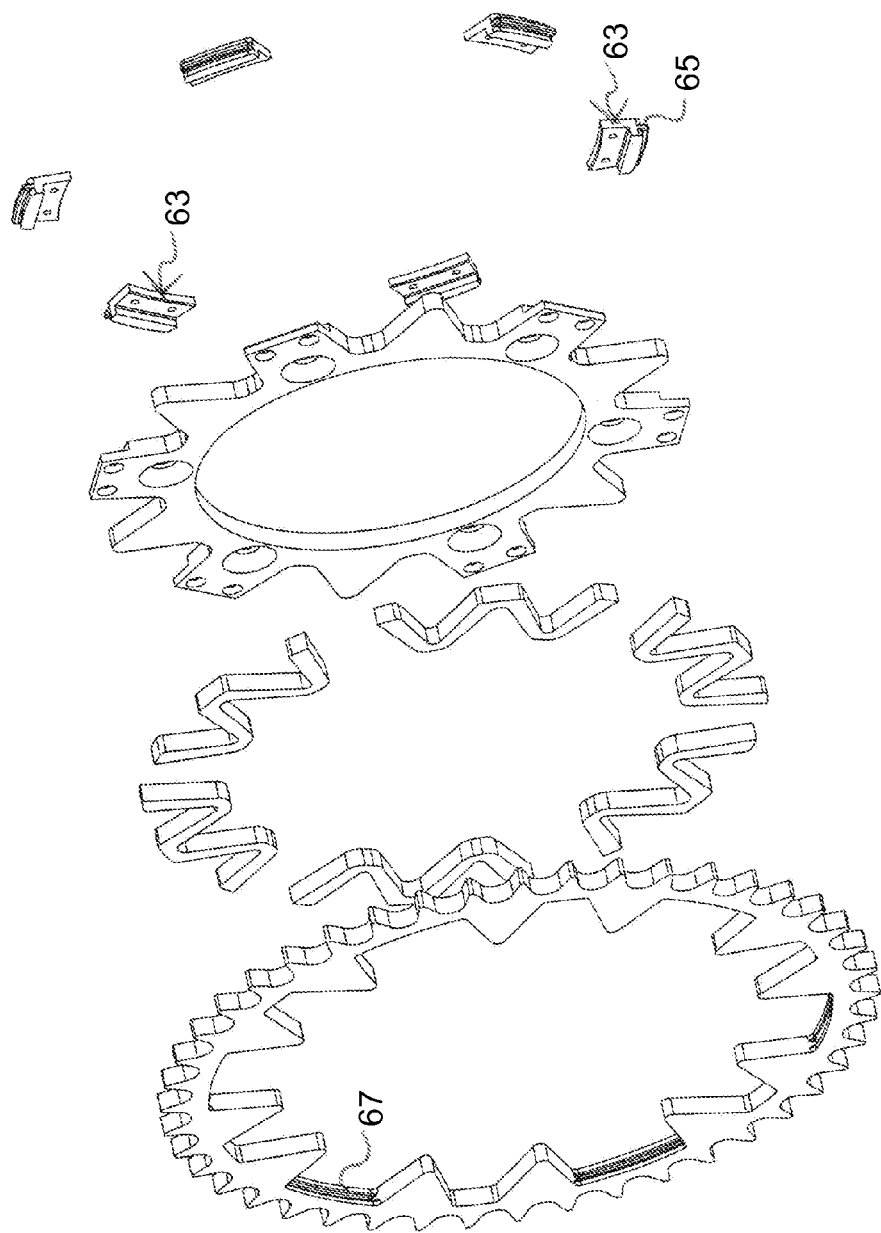
FIGS. 22 to 25 depict yet another embodiment of the present invention.
Figure 23:
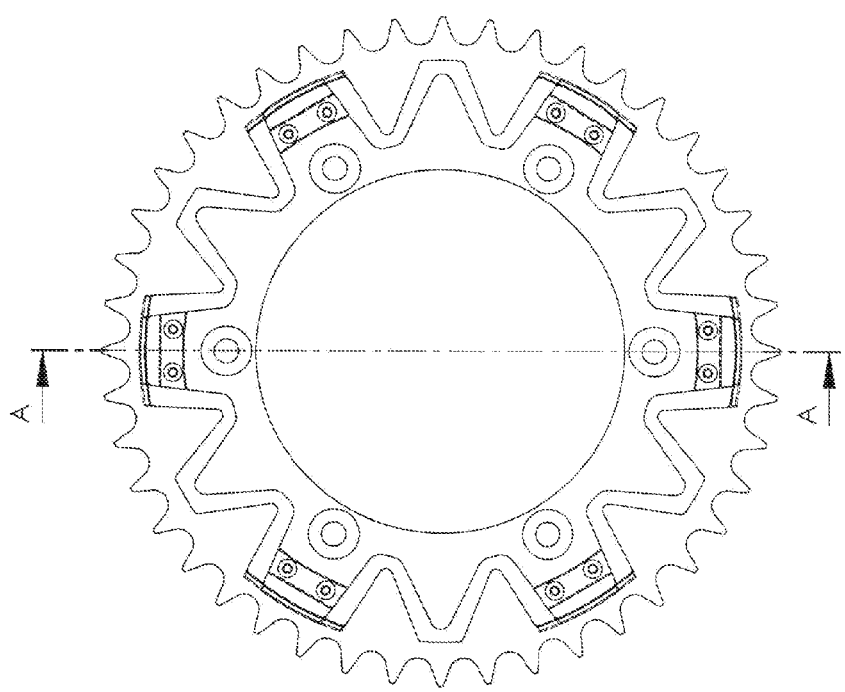
Figure 24:
Figure 25:
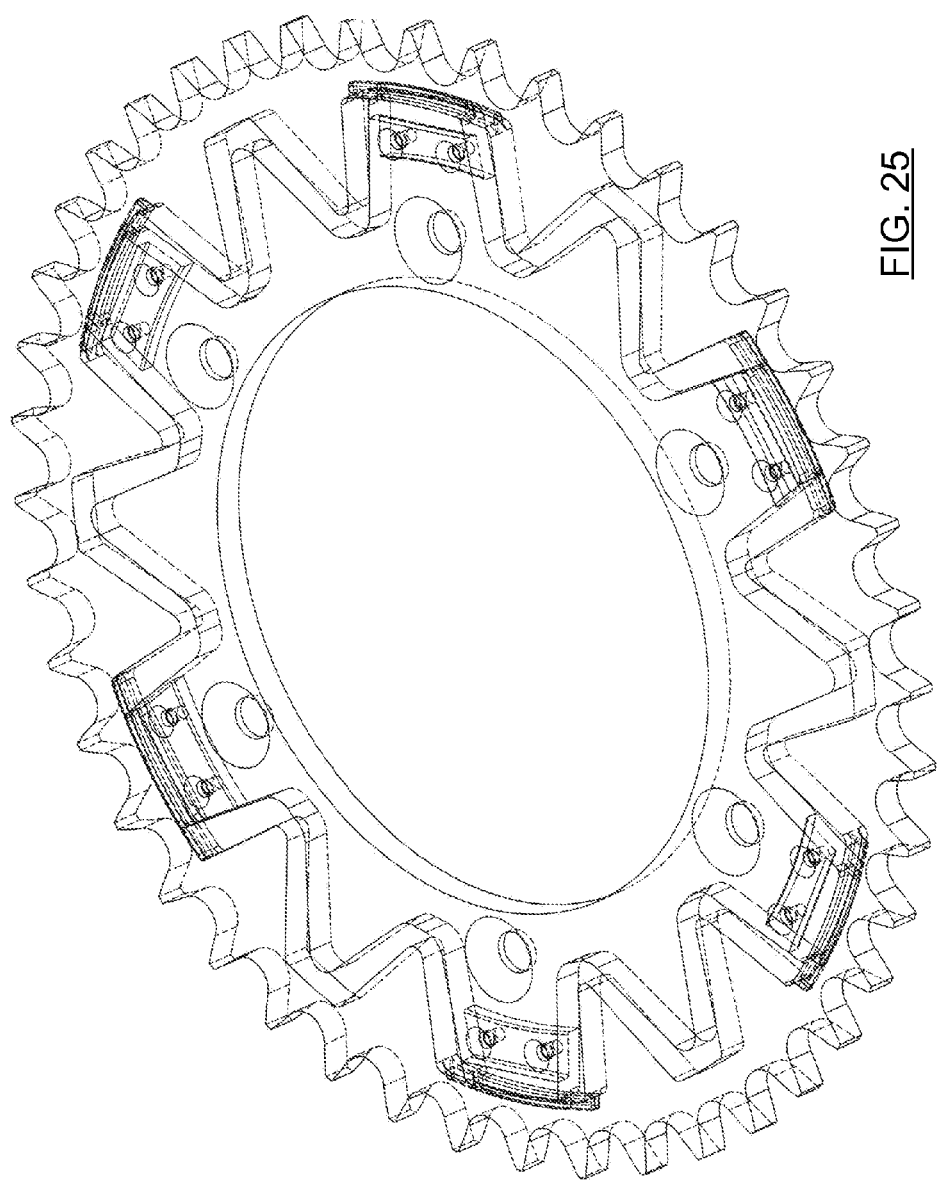

Further variations and embodiment of a sprocket according to the present invention are possible. For example, FIGS. 20 to 21 are views of a further embodiment which includes hardened steel tips 61 on the inner ring that help to lengthen the life of the part.

FIGS. 22 to 25 are views of another embodiment of the invention in which a tongue and groove arrangement was used between the inner plate and the outer ring rather than ball bearings. Removable tips of hardened steel 63 are also used in this embodiment. The removable tips 63 have outer edges that comprise tongues 65 which are received into complementary grooves 67 formed into the inside of the outer ring. The removable tips 63 are attached by screw fasteners (not shown) to the outwardly projecting lugs of the inner plate.

In the present specification and claims, the word "comprising" and its related and derivative terms, including "comprises" and "comprise", are to be interpreted in an inclusive sense as including each of the stated integers but without excluding the inclusion of one or more further integers.

In compliance with the statute, the invention has been described in language more or less specific to structural or methodical features. It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A sprocket comprising:
   an inner plate having a plurality of radially disposed outward lugs;
   an outer ring with corresponding radially disposed inward lugs, supported and revolvable about the inner plate with cushioning material between the said lugs
   wherein a number of meeting faces of the outer ring and inner plate describe a ball race to receive a plurality of ball bearing.

2. A sprocket as claimed in claim 1, wherein the outer ring and inner plate have a corresponding ridge or groove in their meeting faces.

3. A sprocket as claimed in claim 2, wherein outer edges of said outward lugs have replaceable hardened tips fastened thereto.

4. A sprocket as claimed in in claim 1, wherein the cushioning material extends between apexes of the radially disposed outward lugs and an inside of the outer ring.

5. A sprocket as claimed in claim 4, wherein the cushioning material comprises a plurality of cushioning elements shaped to engage with a side of said lugs.

6. A sprocket as claimed in claim 5, wherein a number of the cushioning elements are formed for location between an inside of the outer ring and an outer edge of the radially disposed outward lugs to thereby provide radial cushioning between the inner plate and the outer ring prevent the ingress of debris therebetween.

7. A sprocket as claimed in claim 1, wherein the cushioning material comprises a plurality of cushioning elements shaped to engage with a side of said lugs.

8. A sprocket as claimed in claim 7, wherein a number of cushioning elements making up said cushioning material are formed for location between an inside of the outer ring and an outer edge of the radially disposed outward lugs to thereby provide radial cushioning between the inner plate and the outer ring prevent the ingress of debris therebetween.

9. A sprocket as claimed in claim 1, wherein outer edges of said outward lugs have replaceable hardened tips fastened thereto.

10. A sprocket as claimed in claim 9, wherein the replaceable hardened tips each bear a tongue and wherein said tongues are received into grooves formed on the inside of the inner plate.

11. A sprocket according to claim 1, wherein the outer ring and inner plate are made from metal and the cushioning material is made from elastomer.

12. A sprocket as claimed in in claim 11, wherein the cushioning material extends between apexes of the radially disposed outward lugs and an inside of the outer ring.

* * * * *